UNITED STATES PATENT OFFICE.

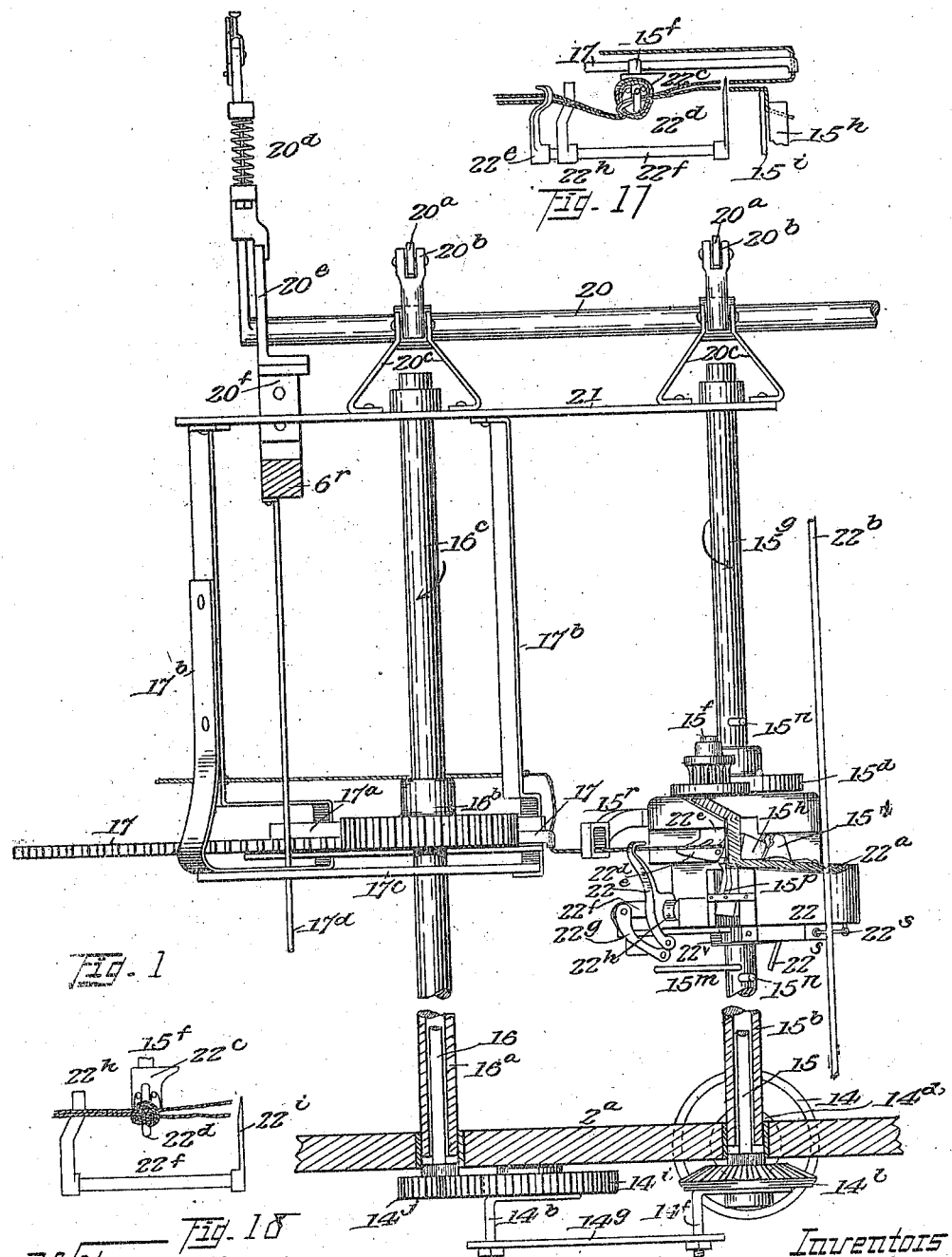

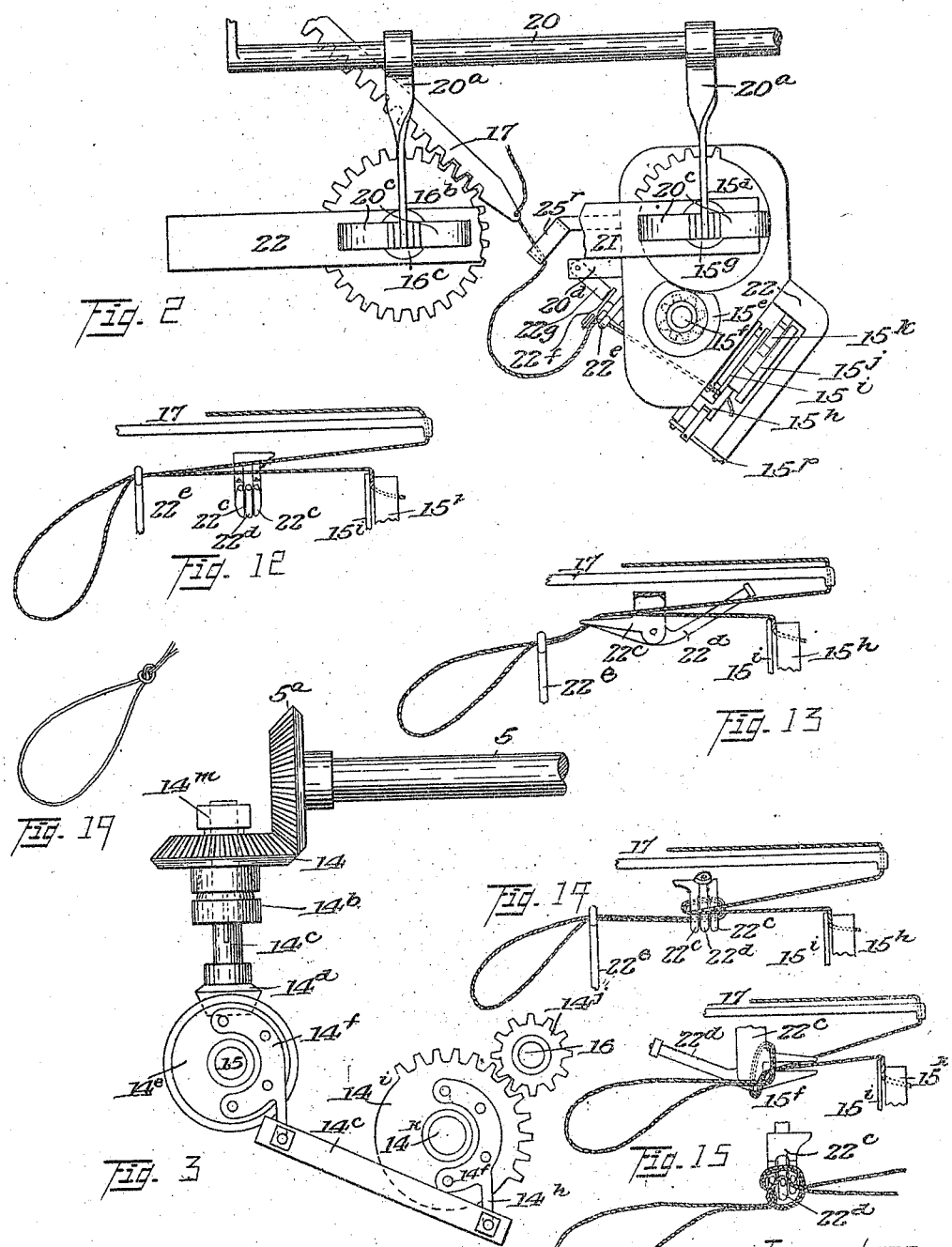

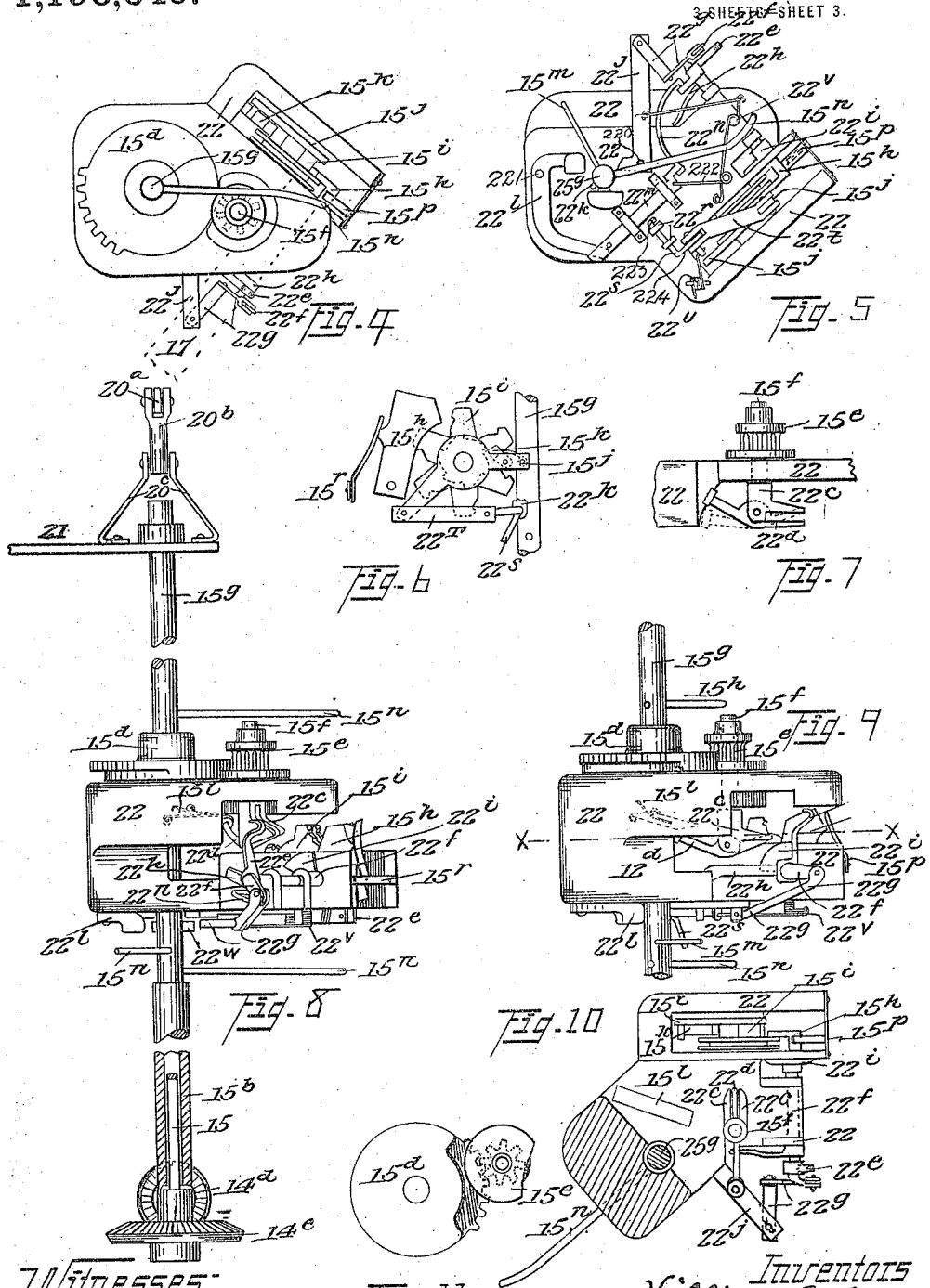

HILLIARD C. BATTLES AND LUTHER F. BATTLES, OF HAMBDEN, OHIO.

TYING APPARATUS.

1,196,640.    Specification of Letters Patent.    Patented Aug. 29, 1916.

Application filed August 20, 1913. Serial No. 785,823.

*To all whom it may concern:*

Be it known that we, HILLIARD C. BATTLES and LUTHER F. BATTLES, citizens of the United States, residing at Hambden, in the county of Geauga and State of Ohio, have invented a new and useful Tying Apparatus, of which the following is a specification.

This invention relates to a device for tying a cord in a knot after the cord has been passed around a bundle.

It relates generally to machinery in which the tying of knots is required, and particularly to harvesting machinery.

An object of this invention is to produce an efficient device which may be applied to and used in connection with machinery in which the tying of bundles constitutes a part of the work to be performed.

Another object of this invention is to produce a device capable of operation in any position without impairing its efficiency.

A further object of this invention is to produce a device for use on harvesting machinery, such as grain binders and grain shockers, where a durable, efficient and comparatively inexpensive knotter is demanded.

A further object of this invention is to produce a device capable of adjustment with relation to the thing to be bound so that a bundle of grain or a shock of grain may be bound around its center, below or above its center, or at any height desired according to the will of the operator.

With the foregoing and other objects in view the invention consists in the arrangement and combination of parts to be hereinafter more fully set forth and claimed.

In describing the invention in detail, reference will be had to the accompanying drawings forming part of this specification; wherein like characters denote corresponding parts in the several views, and in which—

Figure 1 illustrates an elevation partly in section of the invention, showing also the gear wheels of a harvesting machine employed in operating it; Fig. 2 illustrates a top plan view of the invention; Fig. 3 illustrates a fragmentary view of the gearing that may be employed in operating the invention; Fig. 4 illustrates a top plan view of the knotter; Fig. 5 illustrates an underneath plan view of the knotter; Fig. 6 illustrates an enlarged detail view of the cord disk and also of the cord disk clamp; Fig. 7 illustrates an enlarged detail view of the bill hook and the manner of operatively securing the same; Fig. 8 illustrates a view in side elevation of the knotter with its shaft, shown partly in section; Fig. 9 illustrates another view in side elevation with the shaft cut away; Fig. 10 illustrates a sectional view on the line X—X of Fig. 9; Fig. 11 illustrates an enlarged detail view of the gearing employed on the knotter; Figs. 12 to 18 are detail views illustrating the successive positions of the knotting bill and cord while the knot is being tied; and Fig. 19 illustrates an enlarged detail view of the knot tied by the invention.

The bundle tying devices, as such, at present employed in harvesting machinery are practically non-adjustable. In the absence of auxiliary attachments they bind all bundles at approximately the same distance from their butt ends, without regard to the length of the grain stalks. Whether of wheat, oats, rye, barley or other grains, the bundles are tied at the same distance from their butt ends. Where the same tying device must be used in harvesting the different kinds of grains, it is obvious that the device should be capable of ready adjustment in order that the bundles may be bound in proper position in respect to their length. Being manually adjustable, in a moment's time, with relation to the length of the bundle to be bound, our invention provides a device capable of tying bundles and shocks of grain of any kind at that distance between their ends best adapted to secure them. To accomplish this our invention has been constructed so that its chief elements, that is to say, the knotter part and the needle part, are capable of being operatively attached on a member or members, readily movable toward or away from the butts of the bundles in the direction of the length of the same. Moreover the construction of the knotter and needle is such that they will operate in a vertical position, in a horizontal position, or at any angle. In view of this advantage it is obvious that the device may be employed on any machine requiring bundle binding; for the adjustable member or members supporting the needle and knotter may be placed in any position necessary to parallel the length of the bundles during the moments of binding.

In the drawings, the gearing shown for transmitting motion to the shafts supporting the knotter and needle are not a part of this invention, but they are a part of the mechanism of our improved shocking machine which forms the subject-matter of a separate application. Said gears for imparting motion are shown here only for the purpose of facilitating comprehension of this invention.

In the drawings, referring especially to Fig. 3, 5 indicates the main drive shaft to the end of which is secured a bevel gear $5^a$. The shaft $14^c$ has a beveled gear 14 loosely running thereon and this gear is adapted to mesh with and therefore be driven by the bevel gear $5^a$. Slidably keyed to the shaft $14^c$ is a friction clutch $14^b$ which is adapted to govern the actuation of the shaft $14^c$ when thrown into and out of engagement with the rear face of gear 14. The actuation of this clutch may be accomplished in any well known manner.

As shown in Fig. 1, bevel gear $14^e$ is keyed to square shaft 15 which extends upwardly through the square channel centrally provided through the entire length of the knotter shaft $15^g$. The upper end of said shaft $15^g$ is journaled in the cross plate 21 (Fig. 1.) Bevel gear $14^e$ has a wrist pin $14^f$. Cog wheel $14^i$ has a wrist pin $14^h$. These wrist pins are connected by pitman $14^g$. $14^i$ drives $14^j$, which is keyed (Fig. 1) to the square shaft 16. Said shaft 16 slidingly penetrates the channel centrally provided through the length of shaft $16^c$, which is journaled at the top in cross plate 21. Said shaft $16^c$ carries cog wheel $16^b$, which engages the cogs provided on the knotting needle 17. By this means needle 17 is projected when a bundle is to be tied, and withdrawn when the tying is completed, it being obvious that cog wheel $16^b$ must be of sufficient diameter to project needle 17 the required distance. Needle 17 is supported on and guided in the direction of its movement by a guide $17^a$, which also serves to hold the needle in engagement with $16^b$. The guide $17^a$ is held by hangers as $17^b$, secured to cross plate 21. A cross bar $17^c$ braces the lower ends of said hangers and also serves as a bearing for shaft $16^c$. Said bar $17^c$ further contains an eye for the reception of a guide rod as $17^d$, the opposite ends of which are secured to some suitable part of the main machine frame. A quadrant $20^e$ is vertically secured to a support as $20^f$, which may be fastened to any suitable part of the framework of the main machine employing this device. Operating lever $20^d$ is attached at its lower end to a horizontal shaft 20, which may be journaled in stationary parts of the machine employing this invention. To shaft 20 are fixedly secured the forwardly and upwardly extending arms $20^a$, the said arms being of sufficient length to meet imaginary extensions of the shafts $15^g$ and $16^c$. The front ends of arms $20^a$ are connected to the horizontal plate 21 by the connecting pieces $20^b$ and $20^c$, the connections at each end of $20^b$ being pivotal. The upper ends of the shafts $15^g$ and $16^c$ projecting beyond the plate 21 are provided with collars thereby rotatably securing said shafts to the cross plate 21. Shaft $15^g$ driven by square shaft 15 rotates in the direction of the arrows as shown in Fig. 1. Thus the needle and the knotter operatively supported on a common frame may be raised or lowered at will so as to bind bundles or shocks around their centers or above or below their centers as desired. A straight needle, bar-shaped, is used in this invention. One side of the needle is provided with cogs to engage the wheel $16^b$. The operative end of the needle is bent down approximately at right angles, and contains a vertical eye to carry the binding cord. Obviously the binding cord should be supplied to the needle, under proper tension.

Referring now to the knotter, the numeral 22 indicates an irregularly shaped frame. Just below the knotter frame 22, shaft $15^g$ is provided with a cam $22^w$, which contacts with bell crank lever $22^l$ (Fig. 5) when the shaft rotates. $22^l$ is fulcrumed to frame 22 by pin $22^l$ and operates lever $22^m$, secured to the frame by clasps $22^p$. A circular finger $22^n$ pivotally connects $22^m$ with the finger $22^e$, which has a hooked end for the purpose of supporting and guiding the binding cord. When $22^w$ contacts with $22^l$, $22^e$ is swung rearwardly and downwardly so as to draw the binding cord (held between needle 17 and cord disk wheel $15^i$) into the path of the bill hook $22^c$. The large face of cam $22^w$ acting on $22^l$ holds $22^e$ down long enough to permit $22^d$ to swing over the cord (Fig. 13). When $22^w$ releases $22^l$, said $22^l$ and connected parts are returned to normal position by spring 222. Following the disengagement of cam $22^w$ with $22^l$, the cogs of segmental wheel $15^d$ on shaft $15^g$ mesh with bill hook wheel $15^e$, which operates bill hooks $22^d$ and $22^c$. As shown in Fig. 9, bill hook $22^d$ is pivotally secured at the lower end of the heel of $22^c$ and between the fingers thereof. As the bill hooks rotate, the roller provided on bill hook $22^d$ engages a shoulder in the guide channel of frame 22, whereby the said bill hooks are opened (Fig. 7). Upon leaving the channel, the roller on $22^d$ rests on a release spring $15^l$ whereby the bill end of $22^d$ can be drawn down by the action of the forward movement of knot remover $22^h$ by which the knot is removed.

The knotter is threaded by passing the cord through the eye of needle 17, by supporting it on $22^e$, and then projecting it past one of the hooked spokes of cord disk wheel $15^i$. Said $15^i$ is then revolved and the cord secured by clamp 15$^h$. When the mechanism is actuated, needle 17 is projected in proper position over the bill hooks and cord disk wheel (Fig. 12), the two strands of cord being supported by 22$^e$. As soon as the cord is held in proper position, the bill hook is revolved by the engagement of the cogs on segmental wheels 15$^d$ and 15$^e$, and the knot is tied in the manner illustrated by Figs. 12 to 18.

Cord disk wheel 15$^l$ is operated in the following manner: A trip pin 15$^m$ carried by shaft 15$^g$ is arranged to contact at the proper time with crank 223. Shaft 22$^s$ secured by clasps 22$^r$ connects crank 223 with the long crank 224. Through the pivotally held connecting arm 22$^t$, the movement of 224 is imparted to a vertically disposed shaped lever 15$^j$ (Figs. 5 and 6), said lever being yieldingly mounted on a horizontal shaft journaled in frame 22. At its rear end 15$^j$ carries a dog 15$^k$, yieldingly secured by a spring. The office of this dog is to engage one of the six notches provided on the hub of the cord disk wheel 15$^l$, whereby to turn said 15$^l$ one-sixth of its circumference during the process of tying once. To keep the cord taut, a tension clamp 15$^h$ is provided for the forward part of 15$^l$, said clamp 15$^h$ being yieldingly mounted adjacent its lower end to a shaft fixedly secured to the frame. Said clamp is held in engagement with cord disk wheel 15$^l$ by spring 15$^p$. When the cord disk wheel 15$^l$ is turned one notch, spring 22$^u$ acting on lever 22$^t$, serves to reposition 15$^j$ so that dog 15$^k$ engages the next succeeding notch for the next operation.

A knot having been tied on the bill hooks, the next steps are the threading of said cord disk wheel, the cutting of the cords between the bill hooks and cord disk wheel, and the removal of the knot from the bill hooks, all of which are accomplished in the following manner: Shaft 15$^g$ carries a short pin 22$^k$ which contacts with bell crank lever 22$^j$, fulcrumed to knotter frame at 220. Through toggle lever 22$^g$, crank and shaft 22$^f$ are operated. To shaft 22$^f$ are fixedly secured the oval-shaped knife 22$^l$ and the knot discharger 22$^h$. A moment before the bill hook completes its revolution and comes to rest with the tied knot, the cord disk wheel 15$^l$ advances, and while so advancing, the notches in the spokes catch the cord and bind it with the aid of clamp 15$^h$ as above shown. Immediately shaft 22$^f$, through the action of 22$^k$ on 22$^j$, raises knife 22$^l$ and also knot discharger 22$^h$ so that the cord is cut and the knot discharged simultaneously. A spring 22$^v$ serves to return 22$^j$ and associated parts to their normal position after disengagement with 22$^k$.

As illustrated in Fig. 2, the knotter part of the device and the needle part of the device are so disposed that the binding cord is held directly across the pathway of the thing to be bound. By the proper manipulation of the quadrant, the knotter and needle parts are elevated or lowered as a unitary device, and the cord is held at that height at which it is desired to bind the bundle.

What we claim as our invention is—

1. A tying apparatus comprising a pair of square penetrating shafts rotatably secured at their lower ends to a stationary member, a pair of operating shafts longitudinally apertured and adapted to slidingly move on said penetrating shafts, a knotter device supported on and operated by one of the said operating shafts, a straight needle supported adjacent to and operated by the other operating shaft, said straight needle being provided with cogs on one side and having a downwardly projecting point with an eye, gear means on the needle shaft to mesh with the cogs on the straight needle whereby to project the needle to and within and withdraw it from the knotter device, a horizontal lifting plate connecting and upholding the operating shafts and the needle supporting means, and means connected with the lifting plate whereby to elevate and lower said plate and the parts supported thereby.

2. A tying apparatus comprising a horizontal shaft, the ends of said shaft being secured to the framework of the main machine, a horizontal lifting plate, suitable lifting fingers and connections between the said horizontal shaft and the said lifting plate, a pair of operating shafts upheld by and journaled in said lifting plate, said operating shafts being longitudinally apertured whereby to slidably move upon inner penetrating shafts, means for securing the lower ends of said penetrating shafts to a stationary part secured to the main machine, a knotter device operatively supported on one of the operating shafts, a vertical independent guide rod for the knotter device, hangers supported by the lifting plate adjacent the other operating shaft, a horizontal guide piece supported by the hangers, a straight needle having cogs on one side and a downwardly projecting point with an eye supported in said guide, means associated with the needle shaft for operating said needle, and means applied to the lower ends of the inner shafts whereby to rotate the same.

3. A tying apparatus comprising a horizontal shaft, said shaft being secured to parts of the main machine, a quadrant and operating lever associated with said shaft, a horizontal lifting plate, appropriate lifting arms connecting said horizontal shaft with said horizontal lifting plate, a pair of parallel operating shafts upheld by and journaled in said lifting plate, said parallel shafts being adapted to slidably move upon inner square penetrating shafts secured at their lower ends to a stationary member, a straight needle supported from the lifting plate adjacent one of the operating shafts, said straight needle having cogs on one side and a downwardly projecting point with an eye, gear means on the needle shaft for operating said needle, a knotter device supported on and operated by the other operating shaft, said knotter having a frame, a knotting bill housed in the frame, segmental wheels, associated with the operating shaft and operating said knotting bill, a cord disk wheel, a cutting knife, a cord holding finger and a knot discharging finger, all coöperating with the knotting bill, and means connected with the operating shaft whereby to properly operate the said cord disk wheel, cutting knife, cord holding finger and knot discharging finger.

4. In a tying apparatus, the combination with a pair of parallel operating shafts each longitudinally apertured, said shafts being upheld by and journaled in a horizontal lifting plate, shaft means including a quadrant for lifting or lowering said plate and for holding it in the relatively elevated position desired, a pair of square shafts penetrating said operating shafts, said penetrating shafts being rotatably secured at their lower ends in a stationary frame member, suitable means for rotating said shafts, of a straight needle provided with cogs on one side whereby to be operated by a cog wheel on the needle operating shaft, said needle also having a downwardly projecting point with an eye, means subjoined to the lifting plate whereby the needle is held in operative position with relation to its operating shaft, and of a knotter device having a frame part, a knotting bill housed in said frame part, said knotting bill having a finger pivotally secured at the lower end of the heel of and between the knotting bill hooks, segmental wheels mounted on the frame part, said segmental wheels being operated by the knotter operating shaft and adapted to intermittently rotate the knotting bill, a cord disk wheel suitably journaled in the frame, a clamp pivotally secured to the frame and adapted to coöperate with the cord disk wheel, an oval shaped cutting knife, a cord holding finger and a knot discharging finger suitably secured in the frame and coöperating with the knotting bill hooks in tying knots, and means on the knotter shaft for operating the mechanism of the knotter in proper unison.

5. In a tying apparatus, the combination of parallel operating shafts adapted to slidably move upon square inner penetrating shafts rotatably secured at their lower ends to a stationary frame member, means applied to the latter shafts for operating the former shafts, a horizontal lifting plate connecting and rotatably upholding said operating shafts, a horizontal shaft associated with a quadrant and operating lever, means for securing said horizontal shaft to parts of the machine employing this apparatus, lifting arms and connections between said horizontal shaft and said horizontal lifting plate, hangers supported from the horizontal lifting plate adjacent the needle operating shaft, a horizontal guide supported by said hangers, a straight needle supported by said guide, the said straight needle having cogs on one side adapted to mesh with gear means on the needle shaft, said needle further having a downwardly projecting point with an eye, a knotter device supported on the knotter operating shaft, said knotter having a frame part, a knotting bill housed in the frame part, segmental wheels operating the knotting bill, a cord disk wheel, clamp means associated therewith, an oval shaped cutting knife, a cord holding finger and a knot discharging finger operatively secured in the frame and coöperating with the knotting bill, means on the knotter shaft for operating the knotter mechanism in proper unison, and independent guide means for holding the knotter frame against lateral movement.

6. In a tying apparatus, the combination of a stationary member, a member movable within a limit toward and away from the stationary member, and means for moving the movable member, a telescopic shaft having an end of its non-adjustable portion rotatably secured to the stationary member, and having the remote end of its adjustable portion similarly secured to the movable member, a gear wheel on the adjustable shaft portion, a needle-bar in mesh therewith, means carried by the movable member for the support of the needle-bar, a knotter frame supported from the movable member, a pathway in said frame in alinement with the path of the needle-bar, and means for imparting reciprocating rotary motion to the telescopic shaft whereby to cause the needle-bar to advance into and to be withdrawn from its pathway in said frame.

7. In a tying apparatus, the combination of a stationary member, a member adapted for limited movement toward and away from the stationary member, a telescopic shaft having an end of its non-adjustable portion rotatably secured in the stationary member and having the remote end of its adjustable portion similarly secured in the movable member, a knotter frame supported on the adjustable shaft portion, a needle-bar pathway in the frame, a knotting-bill housed in the frame and rotatable in a plane below the pathway plane, a short shaft located below the knotting-bill, means supported by the short shaft for holding a cord, for cutting a cord, and for removing a knot from the knotting bill, all of which means are arranged to operate in the plane of the knotting-bill, a cord disk wheel journaled below the pathway and beyond the knotting bill, a wheel carried by the spindle of the knotting-bill on top of the frame and driven directly by a segmental wheel on the adjustable shaft whereby to intermittently rotate the knotting-bill, a cam and a trip lever carried by the adjustable shaft below the frame, means carried by the frame in the path of the cam and connected with the short shaft whereby to actuate said short shaft, means carried by the frame in the path of the trip lever and connected with the cord disk wheel whereby to turn said cord disk wheel, and means for imparting intermittent rotatory motion to the telescopic shaft.

8. In a tying apparatus, the combination of a stationary member, a member movable within a limit toward and away from the stationary member, and means for moving it, a telescopic shaft having an end of its non-adjustable portion rotatably secured in the stationary member and having the remote end of its adjustable portion similarly secured in the movable member, a knotter frame supported on the adjustable shaft portion, a knotting bill housed in the frame and rotatable on an axis parallel to the adjustable shaft, a segmental wheel carried by the adjustable shaft at the top of the knotter frame, means keyed to the spindle of the knotting-bill and driven by said segmental wheel for intermittently rotating the knotting bill, a cord disk wheel journaled beyond the knotting-bill, said cord disk wheel being provided with notched spokes which operate in the plane of the rotation of the knotting-bill, a tension clamp pivotally secured to the frame in front of the cord disk wheel and adapted to coöperate with the notched spokes thereof to hold a cord, a trip lever carried by the adjustable shaft portion below the knotter frame, a contact lever supported underneath said frame in the path of the trip lever, and means operable by said crank for turning the cord disk wheel one spoke at each instance of contact.

9. In a tying apparatus, the combination with a knotter frame, of a knotting-bill 22° and means for intermittently rotating it, the lower portion of said knotting-bill being provided with a longitudinal slot therethrough to provide two fixed parallel ends each of which is designed with a laterally projecting bill approximately V-shaped, a finger 22ᵈ hinged between the fixed bills thus formed and at the heel thereof, a roller on one end of said finger, and a fixed shoulder in the knotter frame in the path of said roller to act on the same to cause the opposite end of the finger to drop from the fixed fingers during rotation.

HILLIARD C. BATTLES.
LUTHER F. BATTLES.

Witnesses:
ROBERT S. PARKS,
GERALDINE WOODARD.